United States Patent
Chen et al.

(10) Patent No.: US 10,033,516 B2
(45) Date of Patent: Jul. 24, 2018

(54) MULTI-DOMAIN CONNECTION ESTABLISHMENT IN COMPUTER NETWORKING COMMUNICATIONS

(71) Applicant: International Business Machines Corporation, Armonk, NY (US)

(72) Inventors: Lior Chen, Jerusalem (IL); Constantine Gavrilov, Rishon Le-Zion (IL); Alexander Snast, Rishon Le-Zion (IL); Ari Zigler, Elkana (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/364,476

(22) Filed: Nov. 30, 2016

(65) Prior Publication Data

US 2018/0152277 A1   May 31, 2018

(51) Int. Cl.
| | |
|---|---|
| *H04L 12/28* | (2006.01) |
| *H04L 5/16* | (2006.01) |
| *H04L 29/08* | (2006.01) |
| *H04J 1/16* | (2006.01) |

(52) U.S. Cl.
CPC .............. *H04L 5/16* (2013.01); *H04L 67/141* (2013.01)

(58) Field of Classification Search
USPC .................................. 370/252, 230, 278, 386
See application file for complete search history.

(56) References Cited

U.S. PATENT DOCUMENTS

| | | | |
|---|---|---|---|
| 6,469,991 B1 * | 10/2002 | Chuah ..................... | H04L 43/16 370/329 |
| 9,794,304 B2 * | 10/2017 | Fallows .............. | H04L 65/1069 |
| 2008/0126509 A1 | 5/2008 | Subramanian et al. | |

(Continued)

FOREIGN PATENT DOCUMENTS

| | | |
|---|---|---|
| EP | 0570319 A2 | 11/1993 |
| WO | 2012011991 A2 | 1/2012 |

(Continued)

OTHER PUBLICATIONS

Gavrilov, Constantine, "Interconnect Blue Ridge Disclosures", xiv Storage Reinvented, Interconnect Blue Ridge Disclosures, IBM, Apr. 18, 2016, 17 pages.

(Continued)

*Primary Examiner* — John Pezzlo
(74) *Attorney, Agent, or Firm* — Edwrad J. Wixted, III

(57) ABSTRACT

A method, computer program product and computer system achieves full-mesh connectivity between any two domains in a multi-domain computing environment such as an Infiniband or Converged Ethernet environment. A connection between two domains is established using a single connection management identifier, and private payloads in connection management datagrams, to drive full-duplex connectivity over a pair of half-duplex connections. The half-duplex connections are established using one connection request, and one connection ID object. A connection management object interfaces between the two connected domains. The connection management object handles communications across the half-duplex connections while the connected applications operate as if they are communicating over a full-duplex connection.

17 Claims, 8 Drawing Sheets

(56) References Cited

U.S. PATENT DOCUMENTS

| | | |
|---|---|---|
| 2009/0063665 A1 | 3/2009 | Bagepalli et al. |
| 2009/0216925 A1 | 8/2009 | Liu |
| 2009/0274073 A1 | 11/2009 | Sutton |
| 2011/0317716 A1 | 12/2011 | Chalupsky et al. |
| 2013/0201316 A1 | 8/2013 | Binder et al. |
| 2015/0172038 A1* | 6/2015 | Jiang ................. H04L 5/143 370/280 |
| 2017/0187629 A1 | 6/2017 | Shalev et al. |

FOREIGN PATENT DOCUMENTS

| | | |
|---|---|---|
| WO | 2012167268 A1 | 12/2012 |
| WO | 2013028175 A1 | 2/2013 |

OTHER PUBLICATIONS

Lehman et al., "Control Plane Architecture and Design Considerations for Multi-Service, Multi-Layer, Multi-Domain Hybrid Networks", © 2007 IEEE, 5 pages.

Chen et al., "Multi-Domain Connection Establishment in Computer Networking Communications", U.S. Appl. No. 15/581,362, filed Nov. 21, 2017, 34 pages.

IBM Appendix P, list of patents and patent applications treated as related, filed herewith, 2 pages.

\* cited by examiner

MULTI-DOMAIN CONNECTION ESTABLISHMENT IN COMPUTER NETWORKING COMMUNICATIONS

BACKGROUND OF THE INVENTION

The present invention relates generally to the field of computer networking, and more particularly to the field of communications between domains in a multi-domain computer network.

InfiniBand[1] is a computer-networking communications standard that may be used in a computer network for communication among a plurality of devices. Further details of InfiniBand may be found in the publication "InfiniB and Architecture, Specification Volume 1, Release 1.3", published Mar. 3, 2015 by the InfiniBand Trade Association, and the publication is hereinafter referred to as the "InfiniBand standard". The InfiniBand standard provides further descriptions for formats associated with datagrams and other entities of a packet switched network. The InfiniB and standard defines a format for management messages which supports common processing, where the management messages are referred to as management datagrams (MAD). Each management datagram contains the same header format that identifies the class of a management message and the method.

[1] InfiniBand is a registered trademark of the InfiniBand Trade Association.

SUMMARY

A method, computer program product and computer system performs the following operations (not necessarily in the following order): (i) receiving a request to establish a full-duplex connection between a local node and a remote node; (ii) establishing two half-duplex connections between the local node and the remote node; and (iii) managing the two half-duplex connections as a full-duplex connection.

DETAILED DESCRIPTION

Figure 1:
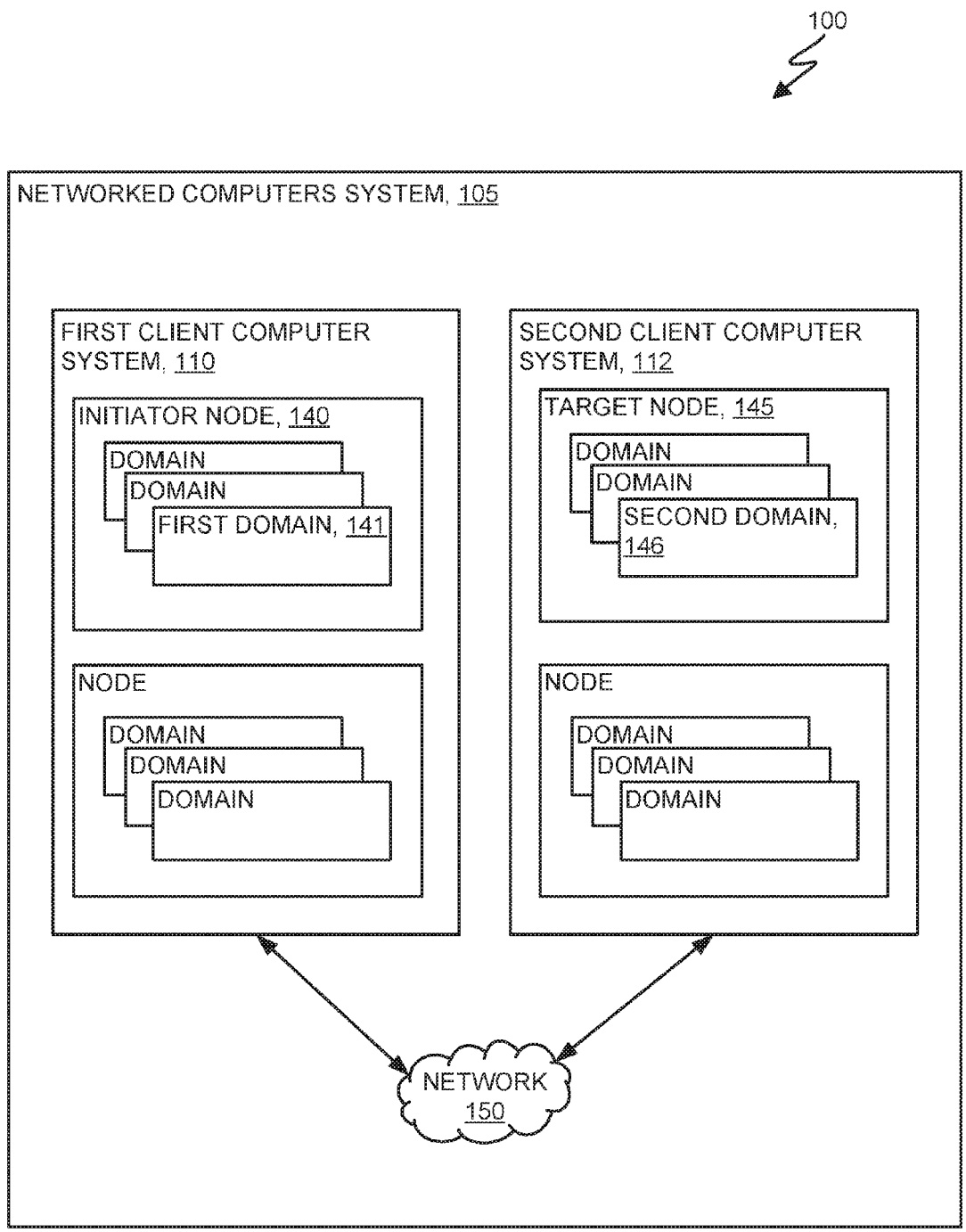
FIG. 1 is a functional block diagram showing one example of a computing environment in accordance with at least one embodiment of the present invention.

Some embodiments of the present invention provide full-duplex connectivity between any two domains in a multi-domain computing environment such as an Infiniband environment. A connection between two domains is established using a single connection management identifier, a single connection management object (for example, a conventional interconnect low-level application programming interface (API)), and private payloads in connection management datagrams, to drive full-duplex connectivity over a pair of half-duplex connections. The half-duplex connections are established using one connection request, and one connection ID object. A connection management object interfaces between two connected domains. The connection management object handles communications across the half-duplex connections while the connected applications operate as if they are communicating over a full-duplex connection.

The Infiniband standard defines connection establishment through use of connection management datagrams (CM MAD) requests and replies.

Infiniband provides connection management (CM) services. Drives, stacks and applications have access to these services. A target side can bind to a service ID. An initiator side that wishes to create a connection, creates a queue-pair (QP) and sends a CM connection request to a given target and CM ID. The initiator specifies, in the CM request, relevant connection-related parameters.

When a request arrives at the target, the target forwards the request to the application that is bound to the relevant service ID. The application sees the initiator-specified parameters of the request and can accept it or reject the request.

If the application rejects the request, it sends a reject message, and releases the target CM ID. If the application accepts the request, it creates a QP on the target, and moves the QP to a ready-to-receive (RTR) state, based on the request parameters received from the initiator.

The target application then sends a reply to the initiator node describing the target parameters. When the initiator node receives the reply, it forwards the reply to the application that sent the initial CM connection request.

The initiator application sees all target parameters in the reply, and may reject the reply or proceed with establishing the connection. If the initiator application rejects the reply, the application sends a reject message to the target, and the initiator proceeds with a recovery path programmed in the application. If the initiator application accepts the reply, the initiator moves its QP to a RTR state and then to a ready-to-send (RTS) state, (based on the target parameters). The initiator then sends a ready-to-use (RTU) message and the process of connection establishment is finished on the initiator side.

When the target receives the RTU message, the target either rejects it or accepts it. If the target rejects the message, the target sends a reject message to the initiator and the target releases the target CM ID and QP. If the target accepts the RTU message, the target QP is moved to an RTS state, and the process of the connection establishment is finished on the target side.

Some implementations skip sending the RTU message and instead, move the target QP to RTS state either after moving to RTR or upon first reception of data.

Each message type (for example, "request," "reply," and "ready-to-use," etc.) allows sending and receiving of private data, the meaning of which is not defined by the Infiniband standard, and is reserved for application use.

Some embodiments of the present invention may include one, or more, of the following features, characteristics and/or advantages: (i) forms a grid block scalable enterprise storage system based on a grid array of hardware components; (ii) attaches to both Fiber Channel Protocol (FCP) and Internet protocol (IP) network Small Computer System Interface (ISCSI) capable hosts; (iii) able to grow in capacity without the need to manage multiple tiers of storage; (iv) handles mixed or random access workloads, including online transaction processing, video streaming, images, email, and emerging workload areas, such as Web 2.0 and cloud storage; (v) supports a wide range of enterprise features, including hardware redundancy, synchronous and asynchronous mirroring, thin provisioning, data migration, quality of service controls, support for virtualization platforms, differential snapshots, compression, data deduplication, encryption, etc.; (vi) provides internal interconnect support for FDR Infiniband; and (vii) supports multiple node types.

Some embodiments of the present invention may include one, or more, of the following features, characteristics and/or advantages: (i) introduces a concept of multi-domain interconnect; (ii) I/O services (cache node, compression node, interface node, gateway node) work with multiple worker threads (also called domains); (iii) each domain works with its own objects to minimize locking and inter-thread communication; (iv) each domain has a private interconnect context, and private connections to other nodes; (v) avoids locking on interconnect objects (locking inhibits high I/O rates on non-uniform memory access (NUMA) systems); (vi) uses private send and receive queues, signaled by private interrupt lines for each domain, that allow resource optimization and easy I/O processing (post and completions) from the domain context; and/or (vii) all connectivity and I/O events (errors and notifications) are processed in the domain context.

Modern interconnects are powerful. A dual port full duplex interconnect with support of 100 Gbit/sec for each port, can process over 12 million 4 kilo-byte (4 KB) messages per second. It is not possible to process that many messages using one hardware queue, one interrupt line or one processor. Modern interconnects support over one hundred hardware queues and over one hundred interrupt lines and are installed in computers having large number of CPUs (numbers in the range 40-128 are typical for modern servers). Multiple application threads are required to utilize interconnect performance and provide input/output (I/O) services in data centers. With large number of CPUs (40-128) and NUMA constraints, it is not possible to share connections across threads, since the cost of locking, connection sharing, and error recovery will be prohibitive. With multi-domain approach, each application thread opens a private device context, creates its own completion queues and connections. There is no locking penalty for posting send and receive requests or for processing completions. The traffic control issues are handled by hardware flow controls, and one domain cannot penalize other domain connections. Since all domain objects are children of the same private device context, the error recovery flows in connections and transmissions in one domain do not affect other domains.

A conventional approach for multi-domain connectivity (discussed in the paragraph above) is to use reliable connections (RC). Reliable connections are full duplex and allow both sides of the connection to exchange data. A Reliable connection connects just two domains (two device contexts) and cannot be used to exchange data with more than one remote domain. To establish full connectivity in a networking communications fabric with M modules and N domains, each module needs to establish M×N×N connections. This can become a serious problem in modern systems. If we consider a modest system with 10 servers, each running 100 threads (on 100 CPUs), we need 100,000 connections. It is difficult (and/or impractical) to establish such a large number of connections. Moreover, interconnects have limits on how many connections can be created or used without adversely affecting performance.

A novel approach to implement multi-domain concept is use of extended reliable connections (XRCscpus). An XRC connection allows establishment of a single domain connection with a destination node. An XRC connection is able to send data to any domain in the destination node. An XRC connection works with shared receive queue objects (SRQs). While a connection is established from a single source domain to a single remote domain, the source domain can send data to any shared receive queue of the destination, and the sent data will be received in the context of the destination domain that the destination SRQ belongs to. Use of XRC connections allows for a decrease in the number of connections since each source domain needs but a single connection to a destination node and does not require separate connections to all domains of the destination node. To establish full connectivity in the networking communications fabric with M modules and N domains, each module needs to establish just M×N connections.

XRC connections are half-duplex. Infiniband connections are represented by objects called queue-pairs (QPs), that exist on the source and destination nodes. The QPs (in conventional reliable connections) comprise send and receive queues and each side can send and receive data. In the case of XRC QPs, the initiator is of XRC send type and has a send queue only. The target is of XRC receive type. It does not have a send queue or a receive queue. To receive data, it can use any SRQ that belongs to the same XRC domain (the SRQs can belong to different device contexts but still be in the same XRC domain and thus exist in different device domains). Thus, the XRC receive QP is a simple multiplexer that checks its state (connected or disconnected) and forwards data to the appropriate application domain.

While use of XRC significantly decreases the number of connections and makes multi-domain approach feasible on modern systems, XRC has unique challenges of its own (including MAD amplification, and needing to create two distinct half-duplex connections when full-duplex connectivity is needed, etc.). Data center applications use transactions that require full duplex connectivity—one side sends data and expects to receive a reply, while the other side also wants to send data and see replies. To answer applications requirements, two half duplex connections need to be created between a pair of source and destination domains (sometimes also referred to as local and remote domains, and also sometimes referred to as initiator and target domains). Each side of the connection requires a send XRC QP in a connected state. The source and destination cannot exchange transactions until two half duplex connections are established. While establishing a single connection is a solved problem, establishing two connections to form a single logical connection is not. Provided solutions and APIs operate on a state of a single connection that has a finite state machine with defined states. Creating and managing two connections independently would result in multiple corner cases when applications start a transaction but the transaction could not be completed because the other side is not connected. Selecting the side of a connection that is to be given the initiator role (the side that will initiate the connection) is also not clear, and neither are error recovery and disconnect flows. In addition, existing APIs do not allow exchange of multi-domain information (SRQ numbers, memory regions, number of domains). The present invention provides solutions for these problems.

The present invention will now be described in detail with reference to the Figures. FIG. 1 is a functional block diagram depicting one example of a computing environment 100 in accordance with at least one embodiment of the present invention. Computing environment 100 includes: networked computers system 105; first client computer system 110; second client computer system 112; initiator node 140; first domain 141; target node 145; second domain 146; and network 150. There may be any number of nodes, including for example initiator node 140, within first client computer system 110. There may be any number of nodes, including for example target node 145, within second client computer system 112. Moreover, within each node (for example, initiator node 140 and target node 145), there may be any number of domains (for example respectively, first domain 141, and second domain 146). Client computer system 110 and client computer system 112 can be any of a desktop computer, a laptop computer, a specialized computer server, or any other computer system known in the art. In some embodiments, client computer system 110 represents a computer system utilizing clustered computers and components to act as a single pool of seamless resources when accessed through network 150. In general, client computer system 110 is representative of any electronic device, or combination of electronic devices, capable of executing machine-readable program instructions, as described in greater detail below with regard to FIG. 7.

In some embodiments of the present invention, first and second client computer systems (110 and 112 respectively), communicate using Infiniband standards and protocols. Any domain (for example, first domain 141) can communicate with any other domain (for example, second domain 146) within networked computers system 105. First domain 141 and second domain 146 may be on the same node, different nodes on the same client computer system, or on nodes on different client computer systems (for example initiator node 140 and target node 145 as shown in FIG. 1). In some embodiments: (i) a node is an application running on a client computer system (for example initiator node 140 running on first client computer system 110); and (ii) a domain (for example first domain 141) is an instance (potentially among many instances) of the application running on the first client computer system 110).

Example Embodiment

Figure 2:
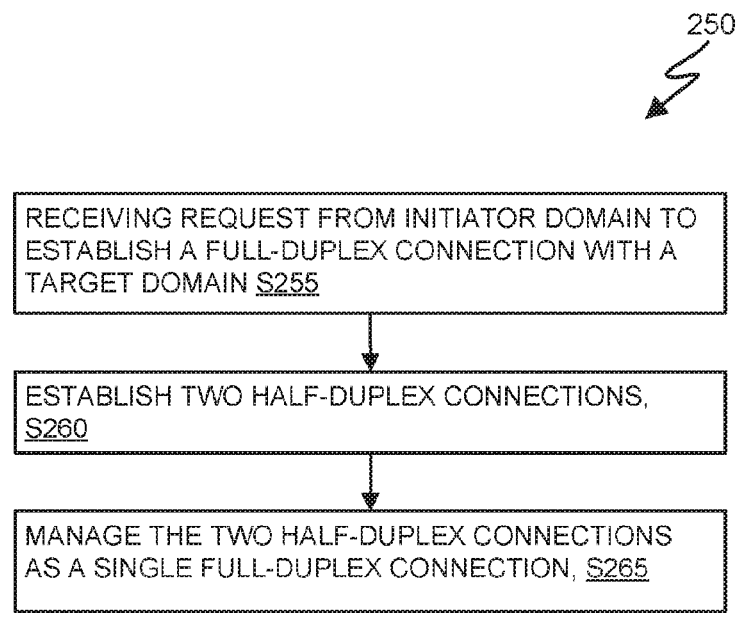
FIG. 2 is a flowchart showing a method in accordance with a first embodiment system of the present invention.
Figure 3:
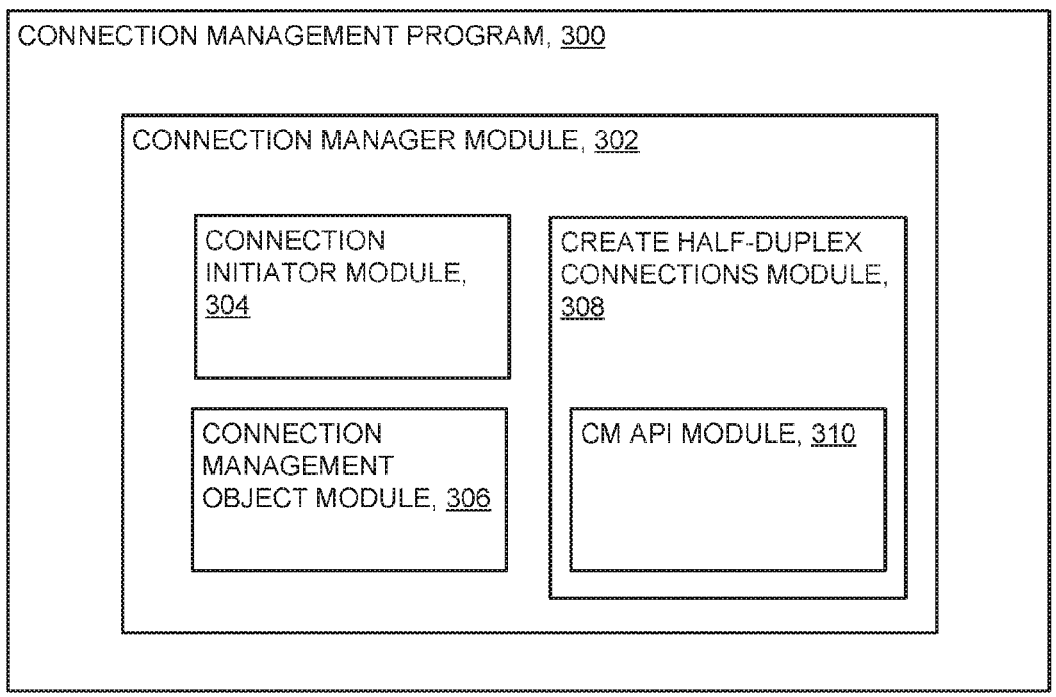
FIG. 3 is a block diagram depicting a machine logic (for example, software) portion of the first embodiment system.

An embodiment of a possible hardware and software environment for software and/or computer logic methods according to the present invention will now be described in detail with reference to FIGS. 2 and 3. FIG. 2 shows flowchart 250 depicting a method according to the present invention. FIG. 3 shows connection management program 300 for performing at least some of the method operations of flowchart 250. This method and associated software will now be discussed, over the course of the following paragraphs, with reference to FIG. 2 (for the method operation blocks) and FIG. 3 (for the software blocks).

Processing begins at operation S255, where connection initiator module 304 of connection manager module 302 of connection management program 300, receives a request from first domain 141, to establish a full-duplex connection between the first domain and second domain 146 (see FIG. 1). In some embodiments, when two domains need to communicate, one of the two domains is given the role of initiator and the other given the role of target. A method for assigning the initiator role is discussed below, under the heading "Select Initiator Role Deterministically."

Processing proceeds at operation S260, where create half-duplex connections module 308 of connection manager module 302 establishes two half-duplex connections between first domain 141 and second domain 146 (see FIG. 1). The connection includes: (i) two half-duplex connections; and (ii) a state (for example, "ready-to-read", "ready-to-send", "error", etc.). Create half-duplex connections module 308 makes use of CM API module 310 (a connection management application programming interface) to establish the two half-duplex connections. CM API module 310 is a conventional low-level interconnection application programming interface. In contrast to conventional connection management, some embodiments of the present invention make use of the CM API module 310 interface to implement a protocol to create and manage two connections as a single connection.

In some embodiments of the present invention, the interface provided by CM API module 310: (i) establishes connections; (ii) breaks connections (typically based on application requests); (iii) sends data; (iv) receives data; (v) informs applications about various events (for example, connects, disconnects, connection requests, errors, etc.); and/or (vi) manages two connections as a single logical connection (using a single connection object of an interconnect low-level API). An application can register callbacks with each instance to receive events or set connection, disconnection, login, or logout parameters.

Processing proceeds at operation S265, where connection management object module 306 instantiates a connection management object (CM object) (not shown in the figures) to manage the two half-duplex connections as a single (logical) full-duplex connection. First domain 141 and second domain 146 (see FIG. 1) interact with the CM object which is interposed in the communication link between the domains. The CM object presents, to the domains, the appearance that the domains are communicating over a full-duplex connection. The CM object essentially (in effect) "hides" the existence of the two half-duplex connections from the first and second domains. The domains interact as if they were communicating over a single full-duplex connection. This is sometimes referred to as driving full duplex connectivity using a single connection management identifier.

FURTHER COMMENTS AND/OR EMBODIMENTS

Some embodiments of the present invention may recognize one or more of the following facts, potential problems and/or potential areas for improvement with respect to the current state of the art: (i) conventional connection management does not address management of two half-duplex connections as a single full-duplex connection; (ii) conventional connection management is not able to exchange shared receive queue (SRQ) numbers, or memory regions' addresses, sizes and keys (the private data size available in conventional connection management (CM) datagrams is not sufficiently large to be used for that purpose); (iii) multiple corner cases are present when the states (for example, connecting, connected, or disconnected) of the two sides (initiator, target) are not the same; (iv) using conventional CM to establish a full duplex connection results in connection management datagram (MAD) amplification (meaning that two connections would be required); (v) MAD traffic has high service guarantees but it is not reliable (meaning losses and timeouts can take place); (vi) since losses and timeouts are not easily distinguishable from one another, further amplification (caused by retries) can take place; and/or (vii) each connection is treated as separate, and two connection objects from a conventional low-level interconnect API.

In contrast to item (v) in the paragraph above, a reliable connection is a connection which provides acknowledgment, to a sender, of a successful delivery to a recipient, and automatically requests repeat transmission in cases of missing data or bit-errors detected by the recipient.

Some embodiments of the present invention may include one, or more, of the following features, characteristics and/or advantages: (i) reduces the number of connection management datagrams (CM MAD) requests; (ii) simplifies the connectivity state machine (in comparison to cases where requests are sent from each party independently); (iii) uses private payloads (within a CM MAD) to exchange connection information between initiator and target nodes; (iv) decreases the number of CM messages required to establish connectivity; and/or (v) decreases the time needed to establish a full duplex XRC connection.

Some embodiments of the present invention perform connection establishment using conventional CM datagrams, and include several new elements as follows: (i) deterministic selection of the node having the initiator role; (ii) use a single connection management identifier (CM ID) and private payloads to drive full duplex connectivity; (iii) send a connection management request (CM request) for full duplex connectivity; and/or (iv) handle the CM request for full duplex connectivity. The foregoing elements will now be further discussed below in the following few paragraphs.

Select Initiator Role Deterministically

In some embodiments of the present invention, when a node needs to connect with another node, one node/application is selected to have the initiator role. (As used herein, an application can be considered to be a node, and the terms "application" and "node" are used interchangeably herein.) The selection is made using a deterministic algorithm, and without negotiation between the two nodes, based on any one, or any combination of, various attributes of the two nodes. For example, the algorithm may assign the initiator role to the node using: (i) a lower IP address; (ii) a higher Infiniband (IB) end-point address; (iii) a host with a hostname lower in a defined sort order; (iv) a device with a lower media access control (MAC) address; and/or (v) a higher domain number, etc. This method does not require negotiation between the two nodes to make the selection. Once the initiator role is assigned to the selected node, the other node is by default the target node. As compared to a conventional approach where the initiator role is determined through negotiation between the two nodes, the deterministic approach described herein: (a) reduces the number of CM MAD requests; and/or (b) simplifies the connectivity state machine.

To initiate a connection sequence, the application that has the initiator role, sends a connection management (CM) request to enable seamless connectivity. For an "on-demand" connection, a side channel is used to request that the initiator start the connection sequence, if for any reason the connectivity is driven from the target node. (This circumstance may arise when a first node needs to communicate with a second node, and the second node is determined to have the initiator role. See above under the heading "Select Initiator Role Deterministically.") The side channel may be, for example, a special CM service ID to channel such requests, or it may be a redundant transmission control protocol (TCP) connection. For example, consider two nodes, A and B, where A is always assigned the initiator role. If B needs to connect to A, this would constitute an "on-demand" connection where B uses the side channel to request that A initiate the connection sequence.

Use a Single Connection Management Identifier and Private Payloads to Drive Full Duplex Connectivity In some embodiments of the present invention, a single CM ID drives two half-duplex connections to establish connectivity between an initiator and a target. The applications use private payloads to exchange information. A single connection object (for example, a conventional interconnect low-level application programming interface (API)) is presented to the applications. The connection object manages a full-duplex connection, and (in effect) "hides" from the application: (i) the presence of two queue-pairs (QPs); and/or (ii) two half-duplex connections. The application remains connected, as long as both QPs are connected. Applications "see" only a standard QP and a standard CM. In some embodiments of the present invention, conventional CM and VERB standards and libraries are extended in such a manner as to avoid the need to send private data. (The VERBS standard describes the behavior of remote direct memory access (RDMA) hardware and software as viewed by the host computer.)

A method in some embodiments of the present invention, for establishing a connection between two domains (applications), in a multi-domain Infiniband environment, will be described in the following few paragraphs, with reference to FIGS. 4A, 4B, 4C and 4D.

Send a Connection Management (CM) Request

Figure 4A:
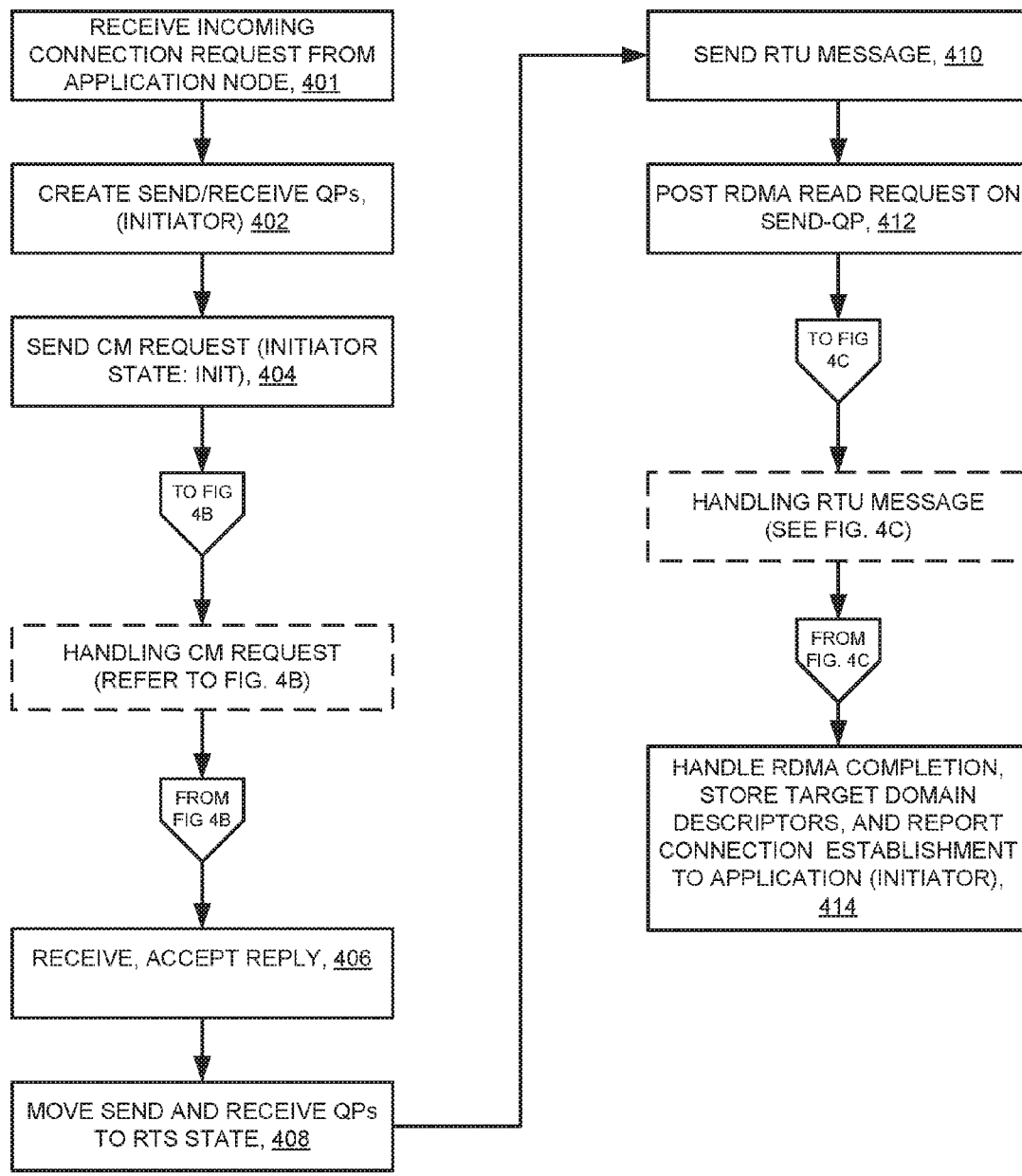
FIG. 4A is a flowchart depicting a method in accordance with at least one embodiment of the present invention.

With reference now to FIG. 4A, an initiator node receives a connection request from an application (401) that wants to connect with a target node (for example initiator node 140 and target node 145 respectively, of FIG. 1). The initiator node creates a send queue-pair (send-QP) and (if full-duplex is required) a receive-queue-pair (receive-QP) (402). In the embodiment of FIG. 4A, the initiator requires a full-duplex connection and therefore creates send and receive QPs. The initiator application (for example initiator node 140) sends (404) a connection management request (CM request) to the target application (for example target node 145). The CM request includes a conventional CM request payload, and an additional CM payload. The additional CM payload includes the following: (i) application service ID; (ii) connection domain number; (iii) number of domains in sender; (iv) a unique process identifier (PID); (v) connection request sequence number (RSN); (vi) receive-QP number (set to 0, if full-duplex is not required); and/or (vii) RDMA segment. The RDMA segment includes a sender node domains descriptor. The sender node domains descriptor describes an array of structures for each domain within the node having the initiator application. The sender node domains descriptor includes the following: (i) domain shared receive queue (SRQ); (ii) domain RDMA address; (iii) domain RDMA size; and/or (iv) domain RDMA key. In some embodiments of the present invention, the additional CM payload is sent as private payload. Some embodiments of the present invention envision the additional CM payload being sent as standard "extended" CM to be developed in the future.

Handle the CM Request

Figure 4B:
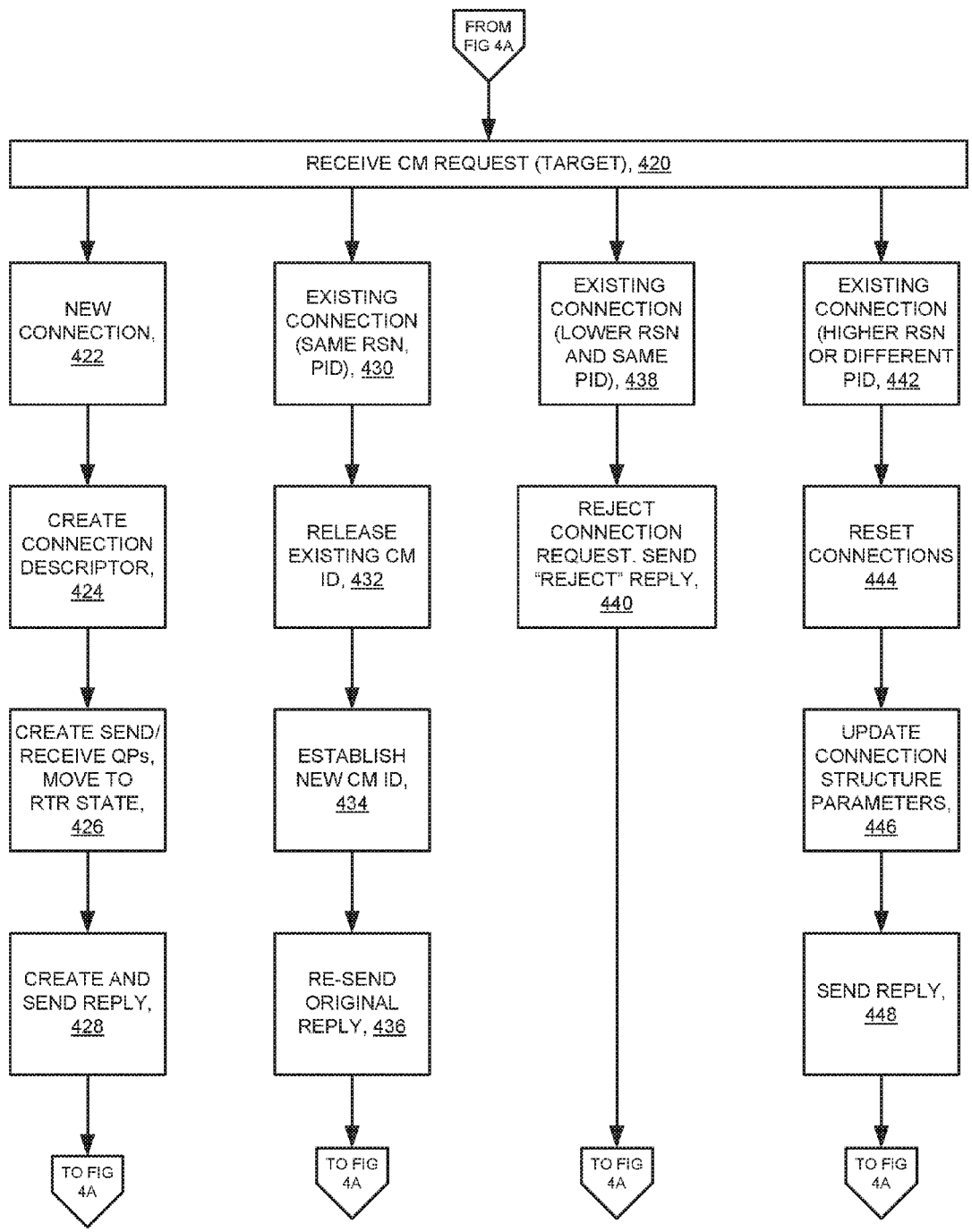
FIG. 4B is a flowchart depicting a method in accordance with at least one embodiment of the present invention.

With reference now to FIG. 4B, processing now proceeds to operation 420 where target node 145 (FIG. 1) receives the CM request, including standard and extended payloads. In response to receiving the CM request, the target may perform one of several possible sequences of actions, depending on various conditions as will be described below. Each possible sequence is respectively represented as a branch from operation 420. Possible sequences include, but are not necessarily limited to, the following sequences as shown: (i) creating a new connection (branch 422); (ii) using an existing connection with same request sequence number (RSN) and process identifier (PID) (branch 430); (iii) handling an existing connection request with lower RSN and same PID (branch 438); and/or (iv) handling an existing connection request with a higher RSN or different PID (branch 442).

The target application may accept or reject the CM request for application reasons that include: (i) an initiator node that is not allowed to connect with the target node (lacks proper authorization, for example); and (ii) a mismatch with respect to one or more application parameters. Further, the CM services layer on the target may reject a CM request for various connection management reasons, in which case no target application will see the request, but the initiator will receive the reject. For example, a CM request to a non-bound service ID may be rejected. Similarly, a request with an incompatible maximum transferable unit (MTU), an incompatible service level, or an inaccessible path may be rejected.

Handling the CM Request: New Connections

With reference now, to branch 422, of FIG. 4B, in some embodiments of the present invention, connection management allows establishment of a new connection, if the application has allowed it. Establishing a new connection includes the following actions: (i) the target creates (424) a connection descriptor; (ii) the target creates send and receive queue-pairs (QPs) and moves them to a ready-to-receive (RTR) state (426); and/or (iii) the target creates, and sends to the initiator, a CM reply message (428) including connection handle parameters, using the request information and the created QP(s), the CM reply message including conventional CM reply payload, and additional CM payload, as private payload in some embodiments (or in some embodiments, as standard extended CM). The additional CM payload includes at least one of the following data elements: (a) application service ID; (b) connection domain number; (c) number of domains in the target; (d) connection sequence number (equal to a value requested in the initial CM request); (e) send-QP number (set to 0, if full-duplex is not required; and/or (f) RDMA segment that contains target node domains information (SRQ number(s), memory region address(es), size(s), and respectively corresponding memory region key(s)).

Further with respect to item (i) in the paragraph above, a connection descriptor is a place-holder for at least one of the following data elements: (i) send-QP; (ii) receive-QP; (iii) CM ID; (vi) local service ID; (v) local domain number; (vi) remote service ID; (vii) remote domain number; (viii) number of remote domains; (ix) remote node PID; (x) connection sequence number; and/or (xi) remote node domain descriptor structures. Sometimes a local node is considered to be an initiator node and a remote node is considered to be a target node.

Processing continues at operation receive, accept reply 406 of FIG. 4.

Handling the CM Request: Existing Connections with Same Request Sequence Number (RSN) and PID With reference now, to branch 430, of FIG. 4B, if, over an existing connection (identified with an existing CM ID), an application (for example target node 145 of FIG. 1) receives a duplicate request (a request having the same sequence number and PID as a previous request) after having replied to the previous request, the situation is handled as if the first reply was lost. In response, the application releases the existing CM ID (432), establishes a new one (434), and re-sends the original reply (436).

Processing continues at operation receive, accept reply 406 of FIG. 4.

Handling the CM Request: Existing Connections with Lower Request Sequence Number and Same PID With reference now, to branch 438, of FIG. 4B, if an application receives a CM request with a lower request sequence number than previous requests, the application rejects the connection request as invalid and returns a "reject" reply to the initiator (440). Reject reply includes at least a reason the request is rejected, such as "INVALID REQUEST SEQUENCE NUMBER".

Processing continues at operation receive, accept reply 406 of FIG. 4.

Handling the CM Request: Existing Connections with Higher Request Sequence Number or Different PID With reference now, to branch 442, of FIG. 4B, if a target application receives a connection request having a higher request sequence number than in previous requests, or having a different PID than in previous requests, connection management considers the request to be valid. This can happen, for example in a case where the initiator has reset the previously established or initiated connections due to application restart or connection error recovery but the target application has not yet seen the disconnect. Since the application has sent a new request with a higher sequence number, the target side of the existing connection considers its respective connections to be stale. Consequently, the target resets (444) its connections.

If both send- and receive-QPs are in a non-connected state (for example, in a reset state or not present) at the time of receiving the connection request, the target application proceeds to satisfy the connection request. The connection request can be considered as new, with the exception that, if present, existing QPs are reused. The target application: (i) updates the connection structure parameters (446) to reflect a new request; and/or (ii) sends a reply (448).

If the send and receive-QPs are already in a connected state at the time of receiving the connection request, they need to be reset which is an asynchronous operation. (Typically the reset has less latency than CM message delivery. However, the reset operation may take additional time if there are non-processed completions on the connection that need to be cleaned. Those completions invoke application callbacks and the time to complete them varies according to circumstances. In general, applications do not starve asynchronous processing (which is I/O and connection management). However, since the operations are asynchronous, processing cannot be completed in the same context. In such a case, the target cannot immediately proceed to satisfy the connection request. Depending on the nature of the application, the target may wish to delay moving (that is, delay resetting) the receive-QP and/or send-QP before clearing completions, to prevent receiving completion errors for operations that have completed without error. Furthermore, after moving send-QP to error, the application may need to wait until after receiving the last completion, before releasing the send-QP. These operations are asynchronous and may trigger connection timeouts on the initiator. Some embodiments of the present invention attempt to avoid such initiator timeouts by taking one of the following actions: (i) target node sends a reject reply including a "stale connection" code (in response to which the initiator issues a retry); and/or (ii) target node sends a message receipt acknowledgment (MRA) message (that triggers an increased timeout period at the initiator). When the reset operation is complete, the target handles the connection request and sends a reply. Further to item (ii) above, an MRA notifies the initiator that its message was received by the target, but that there may be a delay in receiving a reply from the target by the initiator. In response to receiving the MRA, the initiator may increase the timeout period to accommodate the delay without timing out. Once the reset operation is complete, the target application is notified about connection loss.

Processing continues at operation receive, accept reply 406 of FIG. 4.

Handling the Reply

With reference again to FIG. 4A, in some embodiments of the present invention, when the initiator receives a reply to its connection request (receive, accept reply 406), from the target, the initiator either rejects or accepts the reply. The initiator may reject the reply, based, for example, on application reasons (such as a target node that is not allowed to communicate, or a multi-domain application constraint violation) or connection management reasons (such as "invalid RSN", which signifies a target error). In addition, the CM services layer on the initiator may reject a CM reply for various connection management reasons, in which case no initiator application will see the reply, but the target will receive a reply error. For example, replies to released CM IDs are rejected. Similarly, replies with an incompatible MTU, an incompatible service level, or an inaccessible path may be rejected.

If the target application rejects a connection request, the target application sends a reject message to the initiator (440, FIG. 4B). Connection management at the initiator end, rejects the reply if the connection sequence number does not match the value recorded in the connection handle. If the sequence number in the reply matches the value recorded in the connection handle: (i) the application accepts the reply; (ii) the initiator moves the send and receive-QPs to a "ready-to-send" (RTS) state (408) (based on parameters included in the reply); and/or (iii) the initiator sends a "ready-to-use message" (RTU message) (410). If the send and receive-QPs are already in a RTS state, the initiator considers that the RTU message was lost and re-sends the RTU message.

MAD requests are non-reliable and can be lost. Each sender of the payload (REQUEST, RESPONSE, MRA) will receive an error notification from the CM services layer if: (i) CM services layer has not received an acknowledgment about the MAD request message delivery; and (ii) a message timeout expires. This allows (or triggers) the application to re-send the MAD messages. However, typical implementations of CM services do not provide notification about RTU loss to sender. Thus, there is an issue with RTU message with regards to the target state. If CM services acknowledge the delivery of the reply on the target, the target may wait for a (relatively) long time for the RTU message, and will not proceed with its flow of connection establishment if the RTU is lost. To overcome this potentiality, some embodiments of the present invention implement a timer waiting for the RTU message. If timer fires (meaning the timeout period expires), the target re-sends the reply, which triggers an RTU re-send by the initiator and in turn allows the target to proceed with connection establishment. In some embodiments of the present invention, the MRA message is used from the target (with private payload of target PID and connection sequence number) to force the initiator to re-send the RTU.

In some embodiments of the present invention, an RTU message includes additional private fields, including: (i) application process ID; and/or (ii) connection sequence number (CSN) (as present value).

After the initiator sends the RTU message, the initiator posts an RDMA read request on the send-QP (412), to read the remote application domain descriptor structures. After successful RDMA completion, the application is notified about connection establishment. The remote domains descriptors obtained via RDMA request are used in APIs provided by the connection management object module (306)—applications can query Connection Management Module for remote address and size and post RDMA requests to remote domain without the need to know memory keys or SRQ numbers.

Handling the RTU Message

Figure 4C:
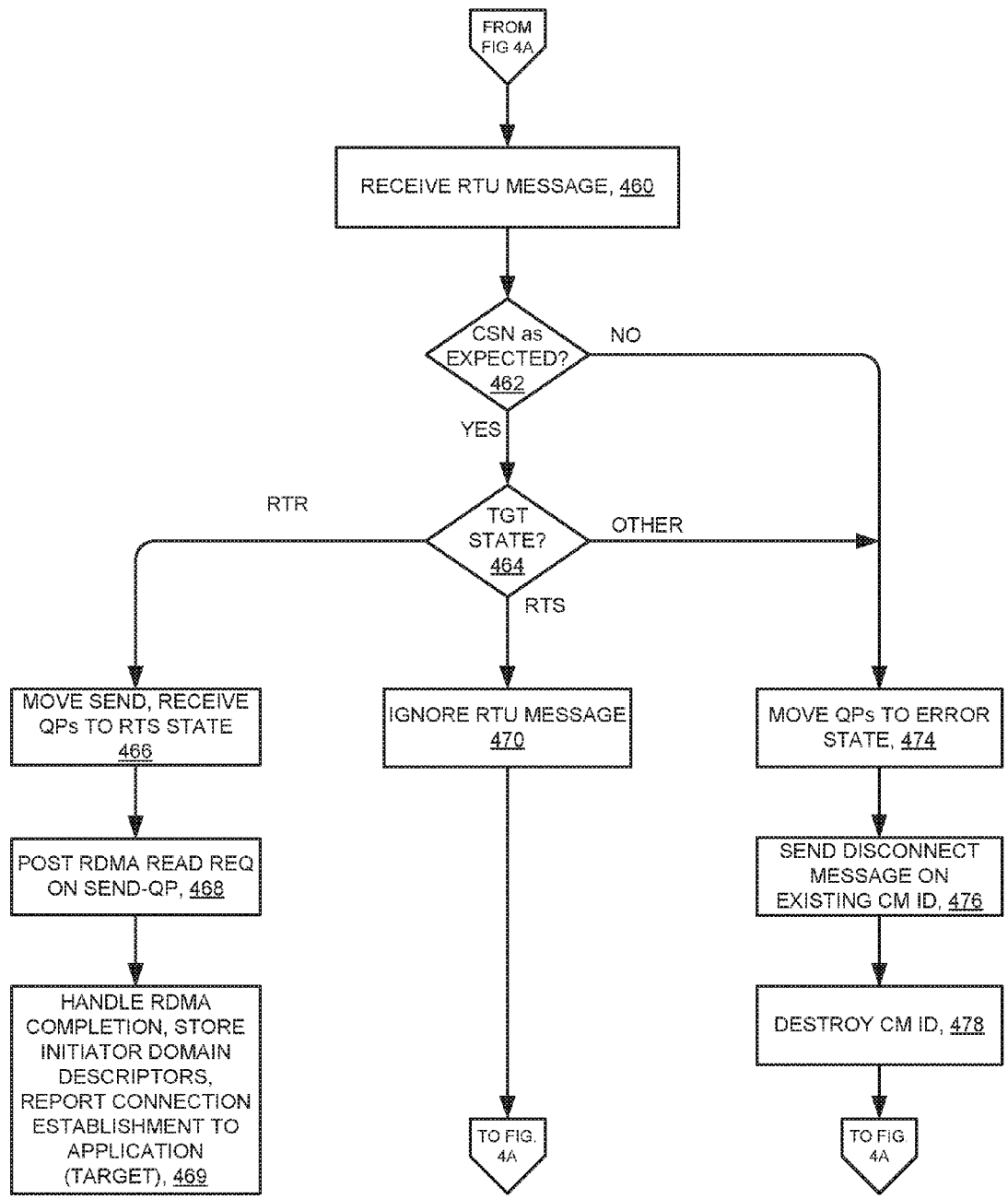
FIG. 4C is a flowchart depicting a method in accordance with at least one embodiment of the present invention.

With reference now to FIG. 4C, when the target node receives an RTU message, it can reject it or accept it. A reject can be based on application reasons (disallowed applications) or connection management reasons.

Handling the RTU Message: Expected Connection Sequence Number when in RTR State

With reference now, to FIG. 4C, when the target receives an RTU message (460) having an expected connection sequence number (decision 462, "Yes" branch), and the connection object is in an RTR state (decision 464, "RTR" branch): (i) the target moves its send- and receive-QPs to a RTS state (466); (ii) the target posts an RDMA read request on the send-QP (468) to read the initiator application domain descriptor structures; and/or (iii) the target handles the RDMA completion, stores the initiator domain descriptors, and reports connection establishment to the application (469).

Handling the RTU Message: Unexpected Connection Sequence Number or when not in RTR State If the target receives an RTU message having an expected connection sequence number (462, "Yes" branch), while the target is in RTS state (decision 464, "RTS" branch), the target considers the message to be an RTU message retry, and ignores the message (470). This can happen if the target implements a timer (as described above with respect to the section "Handling the Reply") to detect a missing expected RTU and sends a repeated REPLY or MRA to force the initiator to re-send the RTU. While the initiator re-sends the RTU, the previously sent RTU may arrive at the target and move it to RTS state. This is not considered an error and does not break established connections.

The target considers other cases (decision 462, "No" branch and/or decision 464, "Other" branch) to be stale connections or application errors. If the target's QPs are not presently in a reset state, the target: (i) moves the QPs to an error state (474); (ii) sends a disconnect message, on the existing CM ID (476); and/or (iii) destroys the CM ID (478). When the reset operation is complete, the target application is notified about connection loss. Resetting connections, sending disconnect request and destroying (also sometimes referred to as releasing) the CM ID will be seen by the initiator as completion errors (if there are active transactions) and disconnect message. This forces the initiator to perform connection recovery (see reset state 514 and notify application of disconnection state 550 of initiator finite state machine 500 (also sometimes herein referred to as initiator FSM 500) of FIG. 5 and the associated description). (The target application is notified. The initiator will be notified via disconnect request and will perform connection recovery in response to the disconnect request.

Handling RDMA Completion

Upon successful RDMA completion, the initiator (414, FIG. 4A) and the target (469, FIG. 4C) nodes report connection establishment to the application.

If an error prevents RDMA completion, the initiator and target nodes move their respective send- and receive-QPs to an error state (unless they are presently in a reset state in which case they remain in the reset state). If a CM ID exists (it may not exist if application has requested disconnect before RDMA completed), the initiator sends a disconnect request and destroys the CM ID.

When the requested disconnect operation is complete: (i) the node reports the connection loss to the application; (ii) the target application releases its QPs; and/or (iii) the initiator application retries making a connection using a new (increased) sequence number and a new CM ID. Further to items (ii) and (iii) above, in some embodiments of the present invention, the initiator and target applications keep their respective QPs for future re-use.

Handling Request Errors

In some embodiments of the present invention, to handle a request error (for example, a timeout), the initiator: (i) destroys the CM ID; (ii) creates a new CM ID; and/or (iii) sends a new request, including an increased sequence number, to the target.

Handling Reply Errors

In some embodiments of the present invention, the target handles reply errors (such as timeouts) by re-sending the reply including the same parameters and sequence number as before. If re-sending reply is not allowed by CM services, or a number of replies reaches the threshold, the target destroys CM ID, and resets its QPs. After QP reset is complete, the QPs can be released or kept for recycling (QP creation may be an expensive operation).

Handling Reject and Disconnect Messages

In some embodiments of the present invention, reject messages may be received in transient states, when the initiator is connecting. Applications may send disconnect requests in the case of completion errors (this may happen automatically) or via API (triggered, for example, because the application is shutting down, or is attempting to fence a remote node).

The target is allowed to send a disconnect message after it has received a RTU message. The initiator is allowed to send a disconnect message after it has received a reply.

In some embodiments of the present invention, if a valid CM IDs exists on both sides of the connection (there was at least a request/accept sequence), termination of the application or destruction of the CM ID on either side of the connection may trigger a disconnect request on the other side of the connection. (Implicit disconnect messages by CM services are allowed on the target side even if it has not handled the RTU request.)

In some embodiments of the present invention, reject and disconnect messages are handled as follows: (i) both the initiator and target nodes transition their respective QPs to error state (unless they are presently in a reset state in which case they remain in the reset state); (ii) both initiator and target flush all pending messages; (iii) the CM ID is destroyed; (iv) initiator and target notify their respective applications about the connection loss (after reset completes); and/or (v) initiator retries the request with an increased sequence number and new CM ID. The target may release its QPs or keep them for future re-use.

Handling Application Disconnect Request

Applications are allowed to send a disconnect request under constraints and scenarios described above in the section "Handling Reject and Disconnect Messages". Both initiators and targets may issue a disconnection request.

In some embodiments of the present invention, if an application requests a disconnection, both the initiator and the target: (i) transition their respective QPs to an error state (unless they are presently in a reset state in which case they remain in the reset state); and/or (ii) flush all pending messages. If a CM ID exists, and disconnect message constraints described above in the section "Handling Reject and Disconnect Messages" allow it, a disconnect request is sent after QP transitions to error state, after which the CM ID is destroyed. Either side is able to request a disconnect. A disconnect may be explicit, in which a private payload can be sent. If no explicit disconnect is sent, then destroying the CM ID will send an implicit request (through CM services) without the private payload). Destruction (or "releasing") of a CM ID may trigger an implicit disconnect message which is always allowed if the remote CM ID is determined to be valid. The explicit CM disconnect request allows the application to provide a private payload that describes disconnect reason(s) and additional information. After the reset operation is completed, applications are notified by connection management object module (306, see FIG. 3) about the connection loss. Initiators can retry establishing a connection, with a request that includes an increased sequence number and a new CM ID. The target node may release the QPs or keep them for future re-use.

In some embodiments of the present invention, a domain has at least one send completion queue (CQ) and at least one shared receive queue (SRQ). The domain holds connections, where each connection includes two queue-pairs: one send QP and one receive QP. Each connection signifies a connection to a remote node. The send QP can post to any domain on the destination node. The receive QP can receive connections from any domain of a peer node. Multiple connections share the same send CQ and SRQ. To achieve "any domain to any domain" connectivity for M modules and N domains, there are (2×N×M) connections on each module (N×M sending and N×M receiving). (In a conventional full duplex implementation, (N×N×M) connections are needed on each module, and this provides domain-to-domain connectivity but cannot provide domain-to-node connectivity without using the same Infiniband (IB) contexts and extensive locking). CQ and SRQ are shared by (but do not belong to) individual connections. Each logical connection includes two QPs and a CM ID object.

In some embodiments of the present invention, connectivity manager (application logic, as distinguished from a connection management Infiniband (CM IB) layer) requests connections based on cluster configuration and cluster exchanges. Connectivity Manager may call Infiniband connection management (IB CM) to initiate connections. An application or hard-coded configuration determines what type(s) of connections to use. If extended reliable connection (XRC) half-duplex is used, then IB CM is invoked to establish a pair of full duplex connections.

Some embodiments of the present invention may include one, or more, of the following features, characteristics and/or advantages: (i) reduces the number of CM MADs by deterministically choosing initiator role between a pair of applications and pair of nodes; (ii) uses a single CM ID to drive a pair of two half-duplex connections; (iii) decreases connection times (decreases the time it takes to establish a connection); (iv) improves connectivity convergence meaning there are fewer retries and fewer corner cases; (v) uses an RDMA memory descriptor to store (and allow application to exchange) node domain descriptor structures; (vi) sends the RDMA memory descriptors in requests and/or replies, which allows each side (initiator/target) to read the domain descriptor of its respective peer (target/initiator); (vii) establish multi-domain connections in Infiniband networks; (viii) connections include establishment of two half-duplex connections simultaneously; (ix) reduces network traffic (reduces the number of CM message exchanged between initiator and target); (x) simplifies some failure scenarios when bi-directional connections are needed; (xi) reduces connection management complexity; (xii) uses one connection request for establishing a pair of half-duplex connections; (xiii) uses one connection ID object for establishing a pair of half-duplex connections; (xiv) reduces the number of connection requests by deterministic selection of initiator; (xv) improves handling of stale connections, lost requests and lost replies though use of private payloads that include application process ID, connection sequence number, and/or service ID; and/or (xvi) avoids corner cases. Further with respect to item (xvi) above, corner cases are avoided when the two sides (initiator, target) are at different states (possible states include, for example, "connecting", "connected", or "disconnected").

Figure 5:
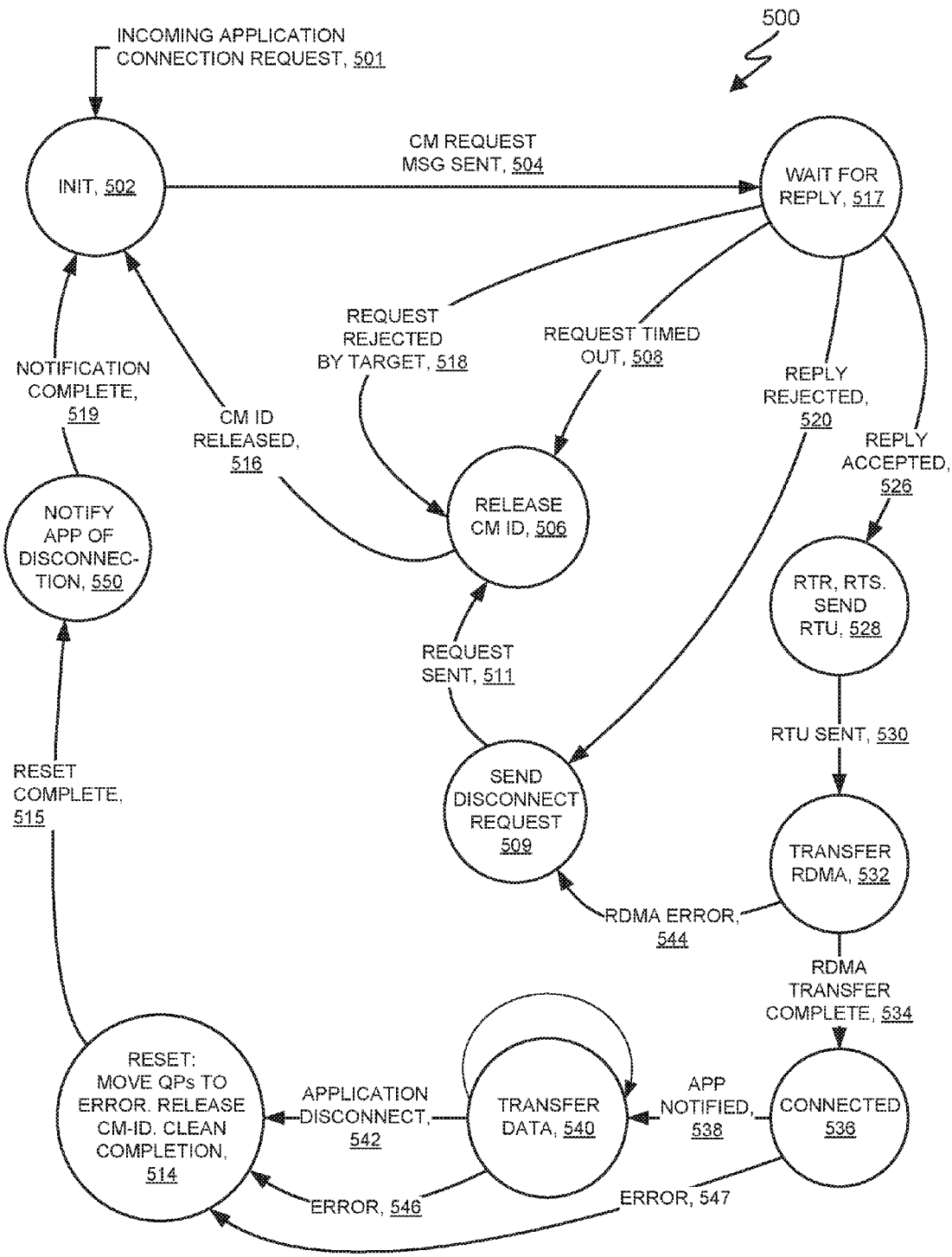
FIG. 5 is a graph of a finite state machine in accordance with at least one embodiment of the present invention.

Initiator finite state machine 500 (initiator FSM 500) will now be discussed with reference to FIG. 5. Initiator FSM 500 summarizes the initiator process flow. The initiator starts at "INIT" state 502 where it is waiting for an incoming request, from a requesting application, to establish a connection between the requesting application and a target application. When such a request (501) is received, the initiator sends a CM request message to the target (transition 504), and the initiator enters wait for reply state 517.

There are several possible transitions out of wait for reply state 517, including the following possible transitions: (i) reply accepted 526; (ii) reply rejected by initiator application 520; (iii) request rejected by target (518); and/or (iv) request timed out 508.

If the reply message is accepted by the initiator (reply accepted 526), the initiator transitions to RTR, then to RTS state, and sends an "RTU message" (528). After sending the RTU message (530), initiator enters a "transfer RDMA" state (532), which when complete (RDMA transfer complete 534), completes the connection, and puts the initiator in a "connected" state (536). The requesting application is notified of a successful connection (transition 538) and the initiator transitions to "transfer data" state (540) where the initiator and target pass data in either or both directions.

In some embodiments of the present invention, transfer data state (540) is terminated by any one of various conditions, including the following conditions: (i) the application requests a disconnect (542); and/or (ii) an error occurs (546) with respect to the transfer.

Once the data transfer is completed (or otherwise terminated) (542 or 546), the initiator enters reset state (514). Upon completion of the reset operation (515), the requesting application is notified of the disconnection (550) which after completion (transition 519) initiator returns to the "INIT" state 502. The reset state (514) includes the following: (i) the send and receive queue-pairs are moved to an "error" state; (ii) completions are cleaned (for example, if there are any posted messages outstanding, the messages are handled); and/or (iii) the CM ID is released.

If the initiator leaves "transfer RDMA" state (532), due to an RDMA error (544), the initiator sends a disconnect request (509) to the target, releases the CM ID (506), and when released (516), re-enters 502 to resend the connection request.

When the initiator is waiting for reply (517), and a reply is received, the initiator may call an application "app callback" (if provided), which may accept or reject the reply. If the reply is accepted (reply accepted 526), the states and transitions that follow have been discussed above. If the initiator rejects the reply, (reply rejected by initiator application 520), the initiator sends a disconnect request (509). When the disconnect request is sent (511), destroys (also sometimes referred to herein as "releases") the CM ID and re-enters 502 to resend the connection request. In some embodiments of the present invention, the disconnect request includes a reason, as determined by the application, for rejecting the reply.

When the initiator is waiting for reply (517), and a reply is received indicating request rejected by target (518), initiator releases the CM ID (506) and transitions (516) to waiting for reply (517).

When the initiator is waiting for reply (517), if no reply is received within a timeout period, some embodiments retry sending the connection request a limited number of times. If no reply to any of the connection request messages is received (508) (that is, the request "times out"), the initiator releases the CM ID (506) and transitions (516) to 502 to resend the connection request.

When in connected state (536), if an error occurs (547), the initiator transitions to a reset state (514) and thereafter, in stages already discussed above, returns to "init" state 502.

Note: In Some embodiments of the present invention, during multiple instances of transitioning from "INIT" state (502) to connected state (536): (i) a new CM ID is created for each instance; and (ii) new QPs are created only once (and re-used in subsequent instances).

Figure 6:
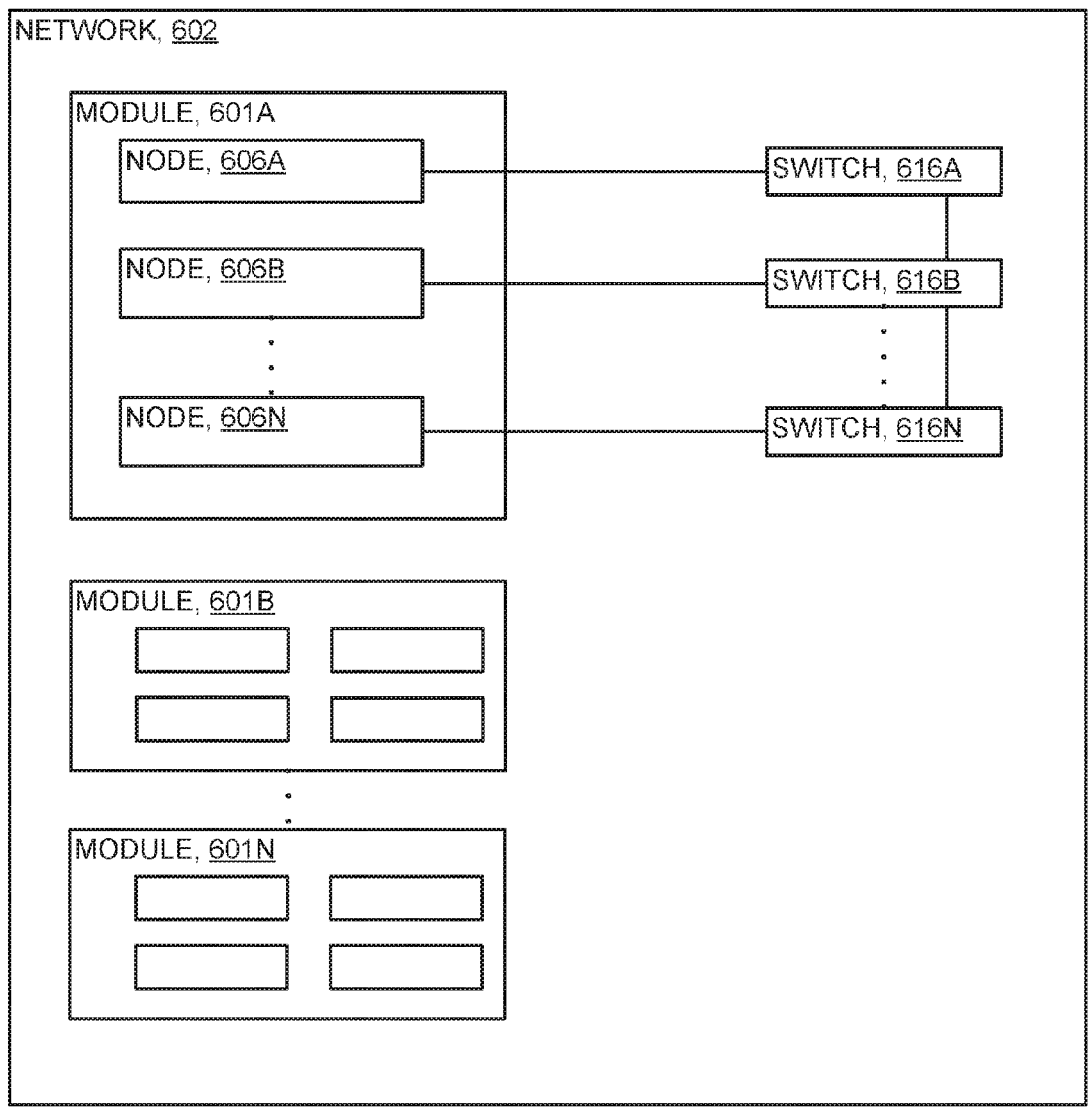
FIG. 6 is a block diagram of a computing environment, in accordance with at least one embodiment of the present invention.

FIG. 6 depicts a block diagram of network 602 in accordance with at least one embodiment of the present invention. FIG. 6 provides an illustration of one embodiment and does not imply any limitations regarding network 602 in which different embodiments may be implemented. In the embodiment depicted in FIG. 6, network 602 includes, but is not limited to: modules 601A, 601B-601N; network 602; nodes 606A, 606B-606N; switches 616A, 616B-616N. Module 601N represents any number of modules within network 602. Node 606N represents any number of nodes within module 601A. In similar fashion, there are any number of nodes within the other modules (including modules 601B-601N. Switch 616N represents any number of switches within network 602. Nodes 606A-606N of Module 601A, as well as nodes within Modules 601B-601N, are interconnected through a networking communications fabric that includes switches 616A-616N as well as interconnections between and among the switches and modules. An aspect of the networking communications fabric is that any node, within any module is able to communicate, with any other node of any module (provided there are no restrictions, such as security and/or application reasons for preventing a given connection).

Network 602 may include additional computing devices, servers, computers, switches, or other devices not shown. It should be appreciated by one skilled in the art that FIG. 6 provides only an illustration of one implementation and does not imply any limitations with regard to the environments in which different embodiments may be implemented. Many modifications to the depicted environment may be made.

Network 602 may be a local area network (LAN), a wide area network (WAN) such as the Internet, any combination thereof, or any combination of connections and protocols which support communications between node 606A and node 606B, switch 616A and switch 616B. Network 602 may be a subnet, or other type of network embedded in a larger system. In one embodiment, network 602 is an Infiniband® network. In another embodiment, network 602 can be a Converged Ethernet Network that allows RDMA over Converged Ethernet communications (ROCE). Network 602 may include wired, wireless, or fiber optic connections. Network 602 provides a network for nodes 606A, node 606B, switch 616A, and switch 616B to communicate with one another without the significant overhead of an operating system. Additionally, network 602 allows nodes 606A and 606B to discover and configure the network fabric.

Node 606A and node 606B each can be a source or destination in communication. Node 606A and node 606B are substantially similar to one another. A communication can be a message, data, or other information which is sent from one location (e.g., a source) to a next location (e.g., a destination) in network 602. Nodes 606A and 606B may be a desktop computer, laptop computer, tablet computer, netbook computer, personal computer (PC), a desktop computer, mobile device, or any programmable electronic device capable of communicating via network 602. Node 606A and node 606B may be, for example, a host node, a destination node, a target node, an initiator node, or any other type of node within the network fabric. In one embodiment, nodes 606A and 606B may be a storage initiator, a storage target, a database server, a database client, a management server, a web server, or other electronic device or computing system capable of processing program instructions and receiving and sending data. In another embodiment, nodes 606A and 606B may be any hardware component such as a processor, random access memory (RAM) or other hardware components which output data that is then sent to another hardware component.

Switch 616A and switch 616B are computer networking devices which connect devices together on network 602. Switch 616A and switch 616B are substantially similar to one another. Network 602 contains at least one switch. Switches 616A and switch 616B route messages or data from the source to the destination based on routing tables which are populated with forwarding information during startup of network 602 or modifications to network 602, as described below. The routing tables may describe unicast or multicast rules and conform to InfiniBand® Linear Forwarding Table (LFT) or Multicast Forwarding Table (MFT) specifications. In another embodiment, the format, content, and organization of the routing tables in switches 616A and 616B is vendor specific. In another embodiment, switches 616A and 616B are multiport network bridges which use hardware addresses to process and forward data. In other embodiments, switch 616A and switch 616B can also process data at the network layer by additionally incorporating routing functionality. In one embodiment, the size and number of ports of switch 616A and switch 616B may vary. In one embodiment, switches 616A through 616B manage the flow of data across network 602 by transmitting a received message from node 606A or node 606B. In another embodiment, switch 616A and switch 616B manage the flow of data across network 602 by exchanging a received message from node 606A to node 606B.

Figure 7:
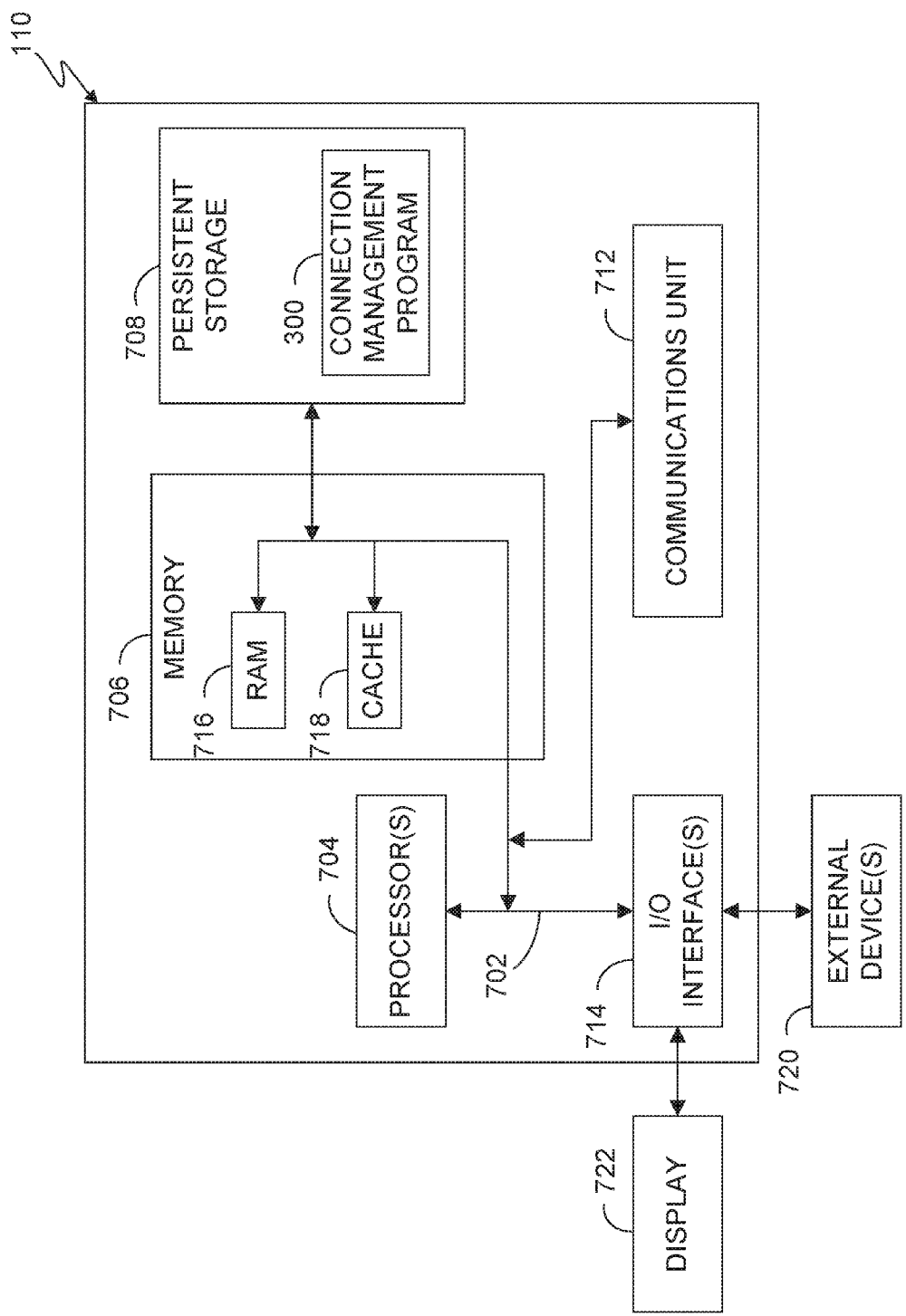
FIG. 7 is a block diagram depicting components of a computer, in accordance with at least one embodiment of the present invention.

FIG. 7 depicts a block diagram of components of first client computer system 110 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

As depicted, the first client computer system 110 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

One or more programs may be stored in persistent storage 708 for access and/or execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to first client computer system 110. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 708 via I/O interface(s) 714. I/O interface(s) 714 also connect to a display 722.

Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for establishing a connection between two computer nodes, comprising:
   receiving a request to establish a full-duplex connection between a local node and a remote node;
   establishing two half-duplex connections between the local node and the remote node;
   managing the two half-duplex connections as a full-duplex connection; and
   driving full duplex connectivity using a single connection management identifier.

2. The method of claim 1, further comprising:
   sending, by an initiator node, a connection management datagram, from the initiator node to a target node, where the connection management datagram includes a private payload.

3. The method of claim 2, wherein the private payload includes at least one of: (i) an application service identifier; (ii) a connection domain number; (iii) a number of domains in the target node; (iv) a connection sequence number; (v) a send queue-pair number; (vi) a receive queue-pair number, and (vii) a remote direct memory access (RDMA) segment that includes target node domains information.

4. The method of claim 1, further comprising:
   selecting, by machine logic rules, an initiator role or a target role for a local domain;
   wherein the selecting is based on at least one of the following: (i) local domain internet protocol (IP) address; (ii) remote domain IP address; (iii) local domain media access control (MAC) address; (iv) remote domain MAC address; (v) local application type; (vi) remote application type; (vii) local domain number; (viii) remote domain number; (ix) local Infiniband address; and (x) remote Infiniband address.

5. The method of claim 1, wherein managing the two half-duplex connections comprises using a single connection management identifier.

6. The method of claim 1, wherein managing the two half-duplex connections comprises instantiating a single connection management object.

7. A computer program product for establishing a connection between two computer nodes, comprising:
   one or more computer readable storage media and program instructions stored on the one or more computer readable storage media, the program instructions comprising instructions to:
   receive a request to establish a full-duplex connection between a local node and a remote node;
   establish two half-duplex connections between the local node and the remote node;

manage the two half-duplex connections as a full-duplex connection; and drive full duplex connectivity using a single connection management identifier.

8. The computer program product of claim 7, further comprising instructions to:

send, by an initiator node, a connection management datagram, from the initiator node to a target node, where the connection management datagram includes a private payload.

9. The computer program product of claim 8, wherein the private payload includes at least one of: (i) an application service identifier; (ii) a connection domain number; (iii) a number of domains in the target node; (iv) a connection sequence number; (v) a send queue-pair number; (vi) a receive queue-pair number; and (vii) a remote direct memory access (RDMA) segment that includes target node domains information.

10. The computer program product of claim 7, further comprising instructions to:

select, by machine logic rules, an initiator role or a target role for a local domain;

wherein the selecting is based on at least one of the following: (i) local domain internet protocol (IP) address; (ii) remote domain IP address; (iii) local domain media access control (MAC) address; (iv) remote domain MAC address; (v) local application type; (vi) remote application type; (vii) local domain number; (viii) remote domain number; (ix) local Infiniband address; and (x) remote Infiniband address.

11. The computer program product of claim 7, wherein managing the two half-duplex connections comprises using a single connection management identifier.

12. The computer program product of claim 7, wherein managing the two half-duplex connections comprises instantiating a single connection management object.

13. A computer system for establishing a connection between two computer nodes, comprising:

one or more computer processors;

one or more computer-readable storage media;

program instructions stored on the computer-readable storage media for execution by at least one of the one or more processors, the program instructions comprising instructions to:

receive a request to establish a full-duplex connection between a local node and a remote node;

establish two half-duplex connections between the local node and the remote node;

manage the two half-duplex connections as a full-duplex connection; and drive full duplex connectivity using a single connection management identifier.

14. The computer system of claim 13, further comprising instructions to:

send, by an initiator node, a connection management datagram, from the initiator node to a target node, where the connection management datagram includes a private payload.

15. The computer system of claim 14, wherein the private payload includes at least one of: (i) an application service identifier; (ii) a connection domain number; (iii) a number of domains in the target node; (iv) a connection sequence number; (v) a send queue-pair number; (vi) a receive queue-pair number; and (vii) a remote direct memory access (RDMA) segment that includes target node domains information.

16. The computer system of claim 13, further comprising instructions to:

select, by machine logic rules, an initiator role or a target role for a local domain;

wherein the selecting is based on at least one of the following: (i) local domain internet protocol (IP) address; (ii) remote domain IP address; (iii) local domain media access control (MAC) address; (iv) remote domain MAC address; (v) local application type; (vi) remote application type; (vii) local domain number; (viii) remote domain number; (ix) local Infiniband address; and (x) remote Infiniband address.

17. The computer system of claim 13, wherein managing the two half-duplex connections comprises using a single connection management identifier.

\* \* \* \* \*